United States Patent [19]

Liu

[11] Patent Number: 4,814,396

[45] Date of Patent: Mar. 21, 1989

[54] BLENDS OF POLYCARBONATE RESINS AND POLYETHERIMIDE ESTER RESINS

[75] Inventor: Nan-I Liu, Mt. Vernon, Ind.

[73] Assignee: General Electric Company, Mt. Vernon, Ind.

[21] Appl. No.: 139,923

[22] Filed: Dec. 31, 1987

[51] Int. Cl.[4] ............................................. C08L 77/00
[52] U.S. Cl. .................................. 525/433; 525/421; 525/425; 525/466
[58] Field of Search ............... 525/433, 466, 421, 425, 525/437

[56] References Cited

U.S. PATENT DOCUMENTS

| | | | |
|---|---|---|---|
| 4,544,734 | 10/1985 | McCready | 528/288 |
| 4,556,688 | 12/1985 | McCready et al. | 525/33 |
| 4,556,705 | 12/1985 | McCready | 528/289 |
| 4,645,802 | 2/1987 | Jackson, Jr. et al. | 525/419 |

*Primary Examiner*—Theodore E. Pertilla
*Attorney, Agent, or Firm*—William F. Mufatti; Daniel De Joseph

[57] ABSTRACT

Novel thermoplastic elastomeric molding compositions having excellent physical properties, which comprise a blend of a polyetherimide ester elastomer and a polycarbonate resin.

24 Claims, No Drawings

BLENDS OF POLYCARBONATE RESINS AND POLYETHERIMIDE ESTER RESINS

The present invention relates to novel thermoplastic elastomeric molding compositions comprising blends of a polyetherimide ester elastomer and a polycarbonate resin. Depending upon their compositional make-up, these compositions have a number of excellent and highly desirable physical properties including high tensile elongation, excellent tensile strength, flexural modulus and excellent heat resistance.

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative are known and are described in U.S. Pat. Nos. 4,544,734 and 4,556,705 to McCready and in U.S. Pat. Nos. 4,556,688 to McCready et al. These polyetherimide esters exhibit excellent stress-strain properties, low tensile set, high melting temperatures and/or excellent strength/toughness characteristics as well as superior flexibility, which properties render said polyetherimide esters specially suitable for molding and extrusion applications.

Aromatic carbonate polymers are well known, commercially available materials having a variety of applications in the plastics art. Generally speaking, aromatic polycarbonate resins offer a high resistance to the attack of mineral acids, may be easily molded, and are strain resistant. In addition, such polymers have a high tensile and impact strength, a high heat resistance, and dimensional stability.

It has now been discovered that blends of a polyetherimide ester elastomer and a polycarbonate resin result in compositions which have excellent physical properties, including impact resistance.

In particular, blends of polyetherimide ester resins and polycarbonate resins result in compositions that have markedly superior tensile strength compared to unmodified polyetherimide ester resins.

SUMMARY OF THE INVENTION

In accordance with the present invention, there are provided improved thermoplastic elastomer molding compositions comprising blends of:
(A) One or more polyetherimide ester elastomers; and
(B) One or more polycarbonate resins.

DETAILED DESCRIPTION OF THE INVENTION

The polyetherimide ester elastomers utilized in the present invention are well known elastomers and are described in U.S. Pat. Nos. 4,544,734 and 4,566,705 to McCready and in U.S. Pat. No. 4,566,688 to McCready et al., all of which are incorporated herein by reference.

The polyetherimide ester elastomers utilized in the invention contain imide groups, polyether groups, and ester groups in the polymer chain. They are comprised of the reaction products of:
(i) at least one diol;
(ii) at least one dicarboxylic acid or its ester forming reactive derivative; and
(iii) a set of reactants selected from
(a) (1) at least one high molecular weight poly(oxy alkylene)diamine, and (2) at least one tricarboxylic acid or its derivative, or
(b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 250 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols are the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4-cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxyic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radical such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethylsuberic acid, tetramethylsuccinic acid, cyclopentanedicarboxylic acid, decahydro-1,5 naphthalene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substitued dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-naptalene dicarboxylic acid, phenantherene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalte is the predominant dicarboxylic acid, most preferable when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula

    I.

wherein G is the radical remaining after the removal of the amino groups of a long chain alkylene ether diamine. These polyether diprimary diamines are available commericially from Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Pat. Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide); terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsquently aminating are useful. Especially preferred poly(alkylene ether) diamines are poly(propylene ether)diamine, poly(tetramethylene ether)diamine, and the poly(ethylene)glycols which are end-capped with poly(propylene ether) and/or propylene oxide and subsequently aminated.

In general, the polyoxylkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3′,4-dipheneyl tricarboxylic anhydride, 3,3′,5-benzophenone tricarboxylic anhydride, 1,3,4-cyclopentane tricarboxylic anhydride, 2,2′,3-diphenyl tricarboxylic anhydride, diphenyl sulfone-3,3′,4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

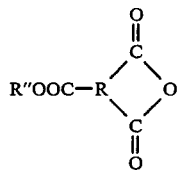

II.

wherein:

R is a trivalent organic radical, preferably a $C_1$–$C_{20}$ aliphatic or cycloaliphatic, or $C_6$–$C_{20}$ aromatic trivalent radical;

R″ is preferably hydrogen or a monovalent organic radical which is preferably selected from $C_1$–$C_6$ aliphatic and/or cycloaliphatic radicals and $C_6$–$C_{12}$ aromatic radicals, e.g., benzyl; R″ is most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of diicarboxylic acid (ii) and of the total moles of the tricarboxylic acid (iii)(a) (2). The amount of the tricarboxylic acid employed will preferably be about two molar equivalents based on the number of moles of the poly(oxy alkylene)diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalklyene diimide diacid, formable from the poly(oxy alkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the desired physical and chemical properties of the resultant polyetherimide ester. In general, the lower ratio of the theoretical amount of polyoxyalklylene diimide diacid to dicarboxylic acid the better the strength, crystallization and heat distortion properties of the polymer. Alternatively, the higher the ratio, the better the flexibilty, tensile set and low temperature impact characteristics.

The instant polyetherimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is the reated with the diol and the dicarboxylic acid to form the polyetherimide ester polymers.

The polyoxyalkylene diimide diacid (iii)(b) may be represented by the general formula

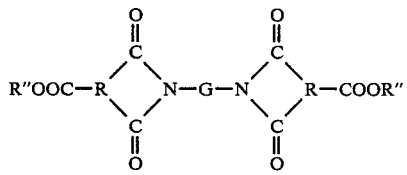

III.

wherein G, R and R″ are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly(oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboylic acid are such that the weight ratio of the polyoxyalkylene diimide to the dicarboxylic acid is from about 0.002 to 2.01:1, preferably from about 0.01 to 2.01:1, more preferably from about 0.25 to 2.0:1, and most preferably from about 0.4 to 1.4:1.

It is also possible, as described in U.S. Pat. No, 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol, hexanediol, or cyclohexane dimethanol; and either a poly(oxy alkylene)diamine having and average molecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalklene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofuctional reactant such as benzoic acid in minor amounts.

With refrence to branching, it should be noted that polymers of this invention, when prepared from preformed diimide diacid, are substantially free of branching. If branching is desired, one needs only to introduce a branching agent, such as trimellitic anhydride, along with preformed diimide diacid. The amount of branching agent will generally be less than about 0.15 moles per mole of diimide diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units;

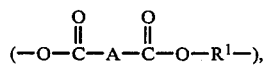, IV.

-continued
and

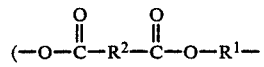 V.

wherein:

A is the residue of the polyoxyalkylene diimide diacid absent the two carboxyl groups, i.e.,

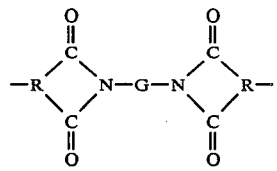

$R^1$ is the residue of the diol absent the two hydroxyl groups, $R^2$ is the residue of the dicarboxylic acid absent the two carboxyl groups, and G is as defined above.

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalklene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

Polycarbonates suitable for use in the present invention are any of those known in the art. Especially preferred polycarbonates are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.30 to 1.0 dl/g as measured in methylene chloride at 25° C. In one embodiment, the polycarbonate are derived from dihydric phenols and carbonate precursors and generally contain recurring structural units of the formula;

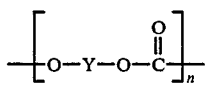

where Y is a divalent aromatic radical remaining after removal of the hydroxy groups from the dihydric phenol employed in the polycarbonate producing reaction, and n is greater than 1, and is preferably from about 10 to about 400.

Preferred polycarbonate resins are of the formula:

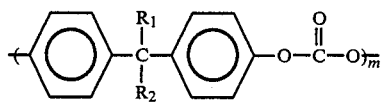

wherein $R_1$ and $R_2$ are independently, (lower) alkyl or phenyl and m is at least 30 and preferably between 40 and 300. The term (lower) alkyl includes hydrocarbon groups of from 1 to 6 carbon atoms.

Suitable dihydric phenols for producing polycarbonates include, for example,
2,2-bis(4-hydroxyphenyl)propane, bis (4-hydroxyphenyl)methane, 2,2-bis(4-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenol)propane, and 3,3'-dichloro-4,4'-dihydroxydiphenyl)methane.

Other dihydric phenols which are also suitable for use in the preparation of the above polycarbonates are disclosed in U.S. Pat. Nos. 2,999,835; 3,038,365; 3,334,154; and 4,131,575, incorporated herein by reference.

It is, of course, possible to employ two or more different dihydric phenols or a copolymer of a dihydric phenol with a glycol or with a hydroxy or acid terminated polyester, or with a diabasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate such as di(trichlorophenyl)carbonate, di(tribromophenyl)carbonate, etc.; di(alkylphenyl)carbonate such as di(tolyl)carbonate, etc.; di(naphthyl)carbonate; di(chloronaphthyl)carbonate; etc., or mixtures thereof. The suitable haloformated include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and Kenneth Miller in U.S. Pat. No. 4,465,820. and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g. dichlorides. A quite useful class of polyestercarbonates are the aromatic polyester carbonates derived from bisphenol A; terephthalic acid or isophthalic acid or a mixture thereof or their respective acid chlorides; and phosgene. If a mixture of terephthalic acid and isophthalic acid is employed, the weight ratio of terephthalic acid to isophthalic acid may be from about 2:8 to about 8:2.

The polycarbonates of the subject blends can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by transesterification processes such as are disclosed in the U.S. Pat. No. 3,153,008, as well as other processes known to those skilled in the art. The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, promellitric acid, pyromellitic dianhydride, mellitic acid, mellitic anhydride, trimesic acid, benzophenonetetracarboxylic acid, benxophenonetetracarboxylic anhydride, and the like. The preferred polyfunctional aromatic compounds are trimellitic anhydride and trimellitic acid or their acid halide derivatives.

The ratio of the polycarbonate resin to the polyetherimide ester resin is not important to the present invention. Preferably, the polycarbonate resin is used in amounts of from about 99 to about 1, most preferably from about 90 to about 10 weight percent, based on 100 total parts by weight of both the polycarbonate resin and the polyetherimide ester resin. Accordingly, the polyetherimide ester elastomer is used in amounts of from about 1 to about 99, most preferably from about 10 to about 90 weight percent.

The compositions of this invention are prepared by any conventional mixing methods which are well known to those skilled in the art. For example, a preferred method comprises mixing the polycarbonate resin and the polyetherimide ester elastomer in powder or granular form in an extruder and extruding the mixture into strands, chopping the strands into pellets and molding the pellets into the desired article.

It should, of course, be obvious to those skilled in the art that other additives may be included in the present compositions. These additives include fillers; plasticizers; pigments; flame retardant additives; reinforcing agents, such as glass fibers; thermal stabilizers; ultraviolet light stabilizers, processing aids, impact modifiers and the like.

EXAMPLES

The following examples serve to give specific illustrations of the practice of this invention but they are not intended in any way to limit the scope of this invention. All parts are by weight unless otherwise specified.

All compositions were prepared by melt blending the various components in a Prodex single screw extruder.

The polyetherimide ester resin utilized in the following Examples was prepared from butanediol, dimethylterephthalate, poly(propylene ether)diamine (average MV 2000) and trimellitic anhydride, wherein the ratio of dimethylterephthalate to diimide diacid was such as to produce a polymer of a flexural modulus of 25000 psi.

The polycarbonate resin utilized in the following Examples was a poly(bisphenol A)carbonate.

The following ASTM methods were used in determining the physical characteristics of the compositions:

| Flexural Modulus | ASTM D790 |
| Tensile Elongation | ASTM D638 |
| Notched Izod | ASTM D256 |
| Unnotched Izod | ASTM D256 |
| Tensile Strength | ASTM D638 |

The Table below illustrates blends of the present invention wherein there is employed, in each of the Examples, various percentages of the polyetherimide ester resin and polycarbonate resin components of the blends of the present invention.

In the Table below, the polyetherimide ester resin component is indicated by the initials PEE and the polycarbonate resin component is by the initials PC. The stabilizer (STAB) used in the Examples was Irganox 1010, a hindered phenol stabilizer manufactured by Ciba-Geigy.

TABLE

| | Example | | | | |
|---|---|---|---|---|---|
| | 1 | 2 | 3 | 4 | 5 |
| PEE | 10.0 | 20.0 | 40.0 | 60.0 | 80.0 |
| PC | 89.5 | 79.5 | 59.5 | 39.5 | 19.5 |
| STAB | 0.5 | 0.5 | 0.5 | 0.5 | 0.5 |
| ⅛ NI | 0.8 | 0.9 | 9.3 | 11 | 14 |
| ⅛ UNI, −30° C. | 4/4NB | 4/4NB | 4/4NB | 16,2/4NB | 6,1/4NB |
| FM | 385K | 403K | 331K | 157K | 57K |
| TS | 11K | 9.5K | 7.6K | 5.6K | 4.3K |
| TE | 130 | 110 | 130 | 160 | 210 |

Obviously, other modifications and variations of the present invention are possible in light of the above teachings. It is, therefore, to be understood that changes may be made in the particular embodiments of the invention described which are within the full intended scope of the invention as defined by the appended claims.

I claim:

1. A thermoplastic molding composition comprising a blend of:
   (A) At least one polyetherimide ester resin, and
   (B) At least one polycarbonate resin;
      wherein the polyetherimide ester resin comprises from about 10 to about 90 percent by weight of the total composition of (A) and (B) and the polycarbonate resin comprises from about 90 to about 10 percent by weight of the total composition of (A) and (B).

2. The composition of claim 1 wherein the polycarbonate resin is an aromatic polycarbonate resin derived from a diphenol and phosgene or a phosgene precursor.

3. The composition of claim 2 wherein the aromatic polycarbonate resin is poly(bisphenol A)carbonate.

4. The composition of claim 1 wherein said polyetherimide ester resin is comprised of the reaction products of:
   (a) at least one diol;
   (b) at least one dicarboxylic acid or an ester forming reactive derivative thereof; and
   (c) a set of reactants selected from
      (1) (i) at least one high molecular weight poly(oxy alkylene)diamine, and (ii) at least one tricarboxylic acid or a derivative thereof, or
      (2) at least one high molecular weight polyoxyalkylene diimide diacid.

5. The composition of claim 4 wherein said diol is a low molecular weight diol.

6. The composition of claim 4 wherein said diol is selected from butanediol, butenediol, hexanediol, cyclohexane dimethanol, or mixtures thereof.

7. The composition of claim 4 wherein said dicarboxylic acid or its derivative is an aromatic dicarboxylic acid or its derivative.

8. The composition of claim 4 wherein (c) is (1).

9. The composition of claim 8 wherein said high molecular weight poly(oxy alkylene)diamine is represented by the formula

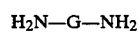

wherein G is the radical remaining after the removal of the amino groups of a long chain alkylene ether diamine.

10. The composition of claim 9 wherein said poly(oxy alkylene)diamine has an average molecular weight of from about 600 to about 12,000.

11. The composition of claim 10 wherein said poly(oxy alkylene)diamine is selected from poly(ethylene ether)diamine, poly(propylene ether)diamine, poly(tetramethylene ether)diamine, copoly(propylene etherethylene ether)diamine, or mixtures thereof.

12. The composition of claim 8 wherein said tricarboxylic acid or its derivative is represented by the formula

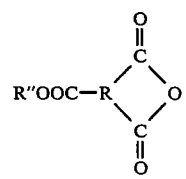

wherein R is a $C_1$ to $C_{20}$ trivalent aliphatic, cycloaliphatic or aromatic radical, and R'' is hydrogen or a $C_1$-$C_6$ aliphatic monovalent radical.

13. The composition of claim 4 wherein (c) is (2).

14. The composition of claim 13 wherein said high molecular weight polyoxyalkylene diimide diacid is represented by the formula

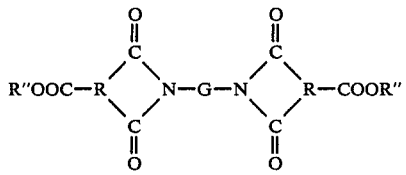

wherein:
each R is independently selected from $C_1$-$C_{20}$ aliphatic, cycloaliphatic or aromatic trivalent organic radicals;
each R'' is independently selected from hydrogen, $C_1$-$C_6$ aliphatic or cycloaliphatic organic radicals, or $C_6$-$C_{12}$ aromatic monovalent organic radicals; and
G is the radical remaining after the removal of the amino groups of a long chain alkylene ether diamine.

15. The composition of claim 14 wherein said long chain alkylene ether diamine has an average molecular weight of from about 600 to about 12,000.

16. The composition of claim 1 wherein said polyetherimide ester resin is comprised of at least the following recurring structural units:

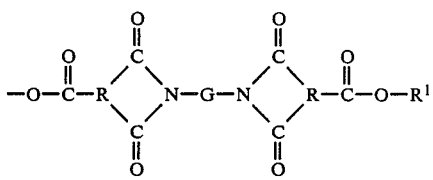

and

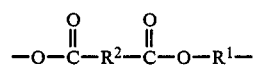

wherein:
$R^1$ is the residue of a diol absent the two hydroxyl groups;
$R^2$ is the residue of a dicarboxylic acid absent the two carboxyl groups;
R is a trivalent organic radical; and
G is the radical remaining after the removal of the amino groups of a long chain poly(oxy alkylene)-diamine.

17. The composition of claim 16 wherein said poly(oxy alkylene)diamine has an average molecular weight of from about 600 to about 12,000.

18. The composition of claim 16 wherein $R^2$ is the residue of an aromatic dicarboxylic acid.

19. The composition of claim 18 wherein $R^2$ is the residue of dimethylterephthalate.

20. The composition of claim 18 wherein $R^1$ is the residue of a diol having a molecular weight of about 250 or less.

21. The composition of claim 20 wherein said diol is selected from butanediol, butenediol, hexanediol, cyclohexane dimethanol or mixtures thereof.

22. The composition of claim 21 wherein said diol is butanediol.

23. The composition of claim 1 which further contains an effective stabilizing amount of at least one thermal stabilizer.

24. The composition of claim 1 which further contains a filler.

* * * * *